(12) United States Patent
Wehrs et al.

(10) Patent No.: US 12,243,734 B2
(45) Date of Patent: *Mar. 4, 2025

(54) SWITCHABLE ION GUIDE

(71) Applicant: Thermo Fisher Scientific (Bremen) GmbH, Bremen (DE)

(72) Inventors: Henning Wehrs, Bremen (DE); Johannes Schwieters, Ganderkesee (DE); Gerhard Jung, Delmenhorst (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,491

(22) Filed: Dec. 4, 2023

(65) Prior Publication Data

US 2024/0177985 A1   May 30, 2024

Related U.S. Application Data

(63) Continuation of application No. 17/612,092, filed as application No. PCT/EP2020/064004 on May 19, 2020, now Pat. No. 11,862,450.

(30) Foreign Application Priority Data

May 21, 2019   (GB) ..................... 1907171

(51) Int. Cl.
*H01J 49/06*     (2006.01)
*F16K 1/20*      (2006.01)
(Continued)

(52) U.S. Cl.
CPC .......... *H01J 49/063* (2013.01); *F16K 1/2007* (2013.01); *H01J 49/005* (2013.01);
(Continued)

(58) Field of Classification Search
CPC ...... H01J 49/022; H01J 49/063; H01J 49/065; H01J 49/067; H01J 49/068; H01J 49/005; H01J 49/0077
See application file for complete search history.

(56) References Cited

U.S. PATENT DOCUMENTS 2,939,952 A   6/1960   Wolfgang et al.
5,941,501 A * 8/1999   Biegelsen ........... F16K 99/0007
                                              251/129.01
(Continued)

FOREIGN PATENT DOCUMENTS

JP   62118133 U  *  7/1987
JP   S62118133 U    7/1987

OTHER PUBLICATIONS

PCT/EP2020/064004, International Search Report and Written Opinion, Oct. 13, 2020, 20 pages.
(Continued)

*Primary Examiner* — David E Smith

(57) ABSTRACT

An ion optical arrangement (1) for use in a mass spectrometer comprises a collision cell defining an ion optical axis along which ions may pass, electrodes comprising a set of parallel poles (11A, 11B, 11C) arranged in the collision cell, and a voltage source for providing voltages to the electrodes to produce electric fields. The ion optical arrangement is arranged for switching between a first operation mode in which the collision cell is pressurized and a second operation mode in which the collision cell is substantially evacuated. The ion optical arrangement is further arranged for producing a radio frequency electric focusing field in the first operation mode and a static electric focusing field in the second operation mode.

19 Claims, 6 Drawing Sheets

(51) Int. Cl.
    *H01J 49/00* (2006.01)
    *H01J 49/02* (2006.01)
    *H01J 49/10* (2006.01)
    *H01J 49/42* (2006.01)

(52) U.S. Cl.
    CPC ........ *H01J 49/0077* (2013.01); *H01J 49/022* (2013.01); *H01J 49/065* (2013.01); *H01J 49/067* (2013.01); *H01J 49/068* (2013.01); *H01J 49/105* (2013.01); *H01J 49/421* (2013.01); *H01J 49/4215* (2013.01)

(56) References Cited

U.S. PATENT DOCUMENTS

| | | | |
|---|---|---|---|
| 6,140,638 A | 10/2000 | Tanner et al. | |
| 6,323,482 B1 * | 11/2001 | Clemmer | H01J 49/42 250/282 |
| 6,534,764 B1 * | 3/2003 | Verentchikov | H01J 49/004 250/288 |
| 8,890,058 B2 | 11/2014 | Takeuchi et al. | |
| 11,862,450 B2 * | 1/2024 | Wehrs | H01J 49/421 |
| 2003/0234376 A1 | 12/2003 | Cabuz et al. | |
| 2011/0012017 A1 | 1/2011 | Nishiguchi | |
| 2015/0102215 A1 | 4/2015 | Jung et al. | |
| 2016/0027633 A1 | 1/2016 | Jung et al. | |
| 2016/0181084 A1 | 6/2016 | Smith | |
| 2018/0102239 A1 * | 4/2018 | Schoen | H01J 49/005 |
| 2018/0286659 A1 | 10/2018 | Guna | |

OTHER PUBLICATIONS

PCT/EP2020/064005, International Search Report and Written Opinion, Aug. 24, 2020, 17 pages.

PCT/EP2020/064007, International Search Report and Written Opinion, Oct. 9, 2020, 23 pages.

Shikida M et al., Electrostatically Driven Gas Valve with High Conductance, Journal Of Microelectromechanical Systems, IEEE Service Center, vol. 3, No. 2, Jun. 1, 1994 (Jun. 1, 1994), pp. 76-79, XP000459055, ISSN: 1057-7157, DOI: 10.1109/84.294324.

* cited by examiner

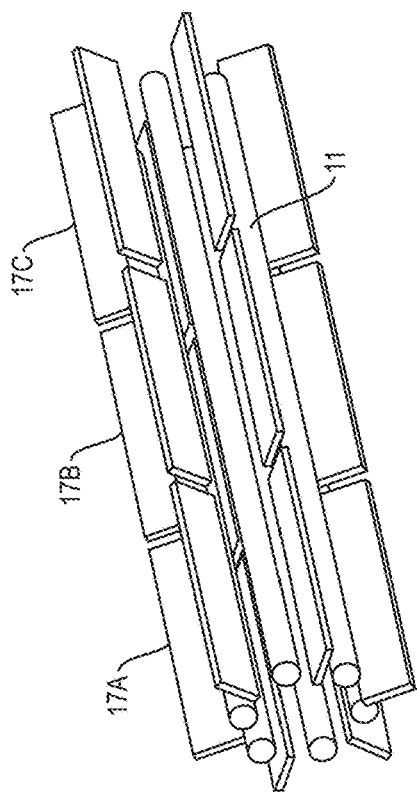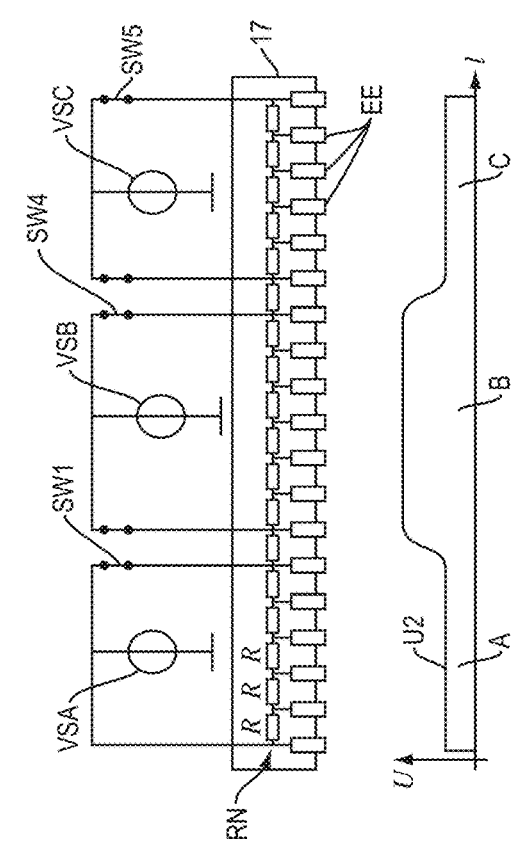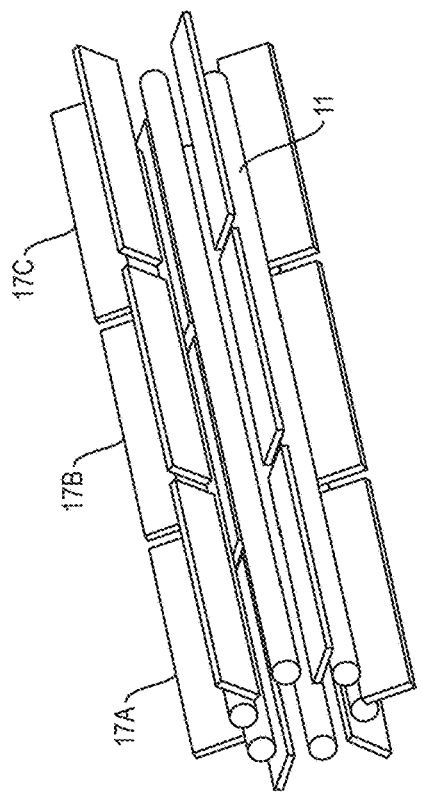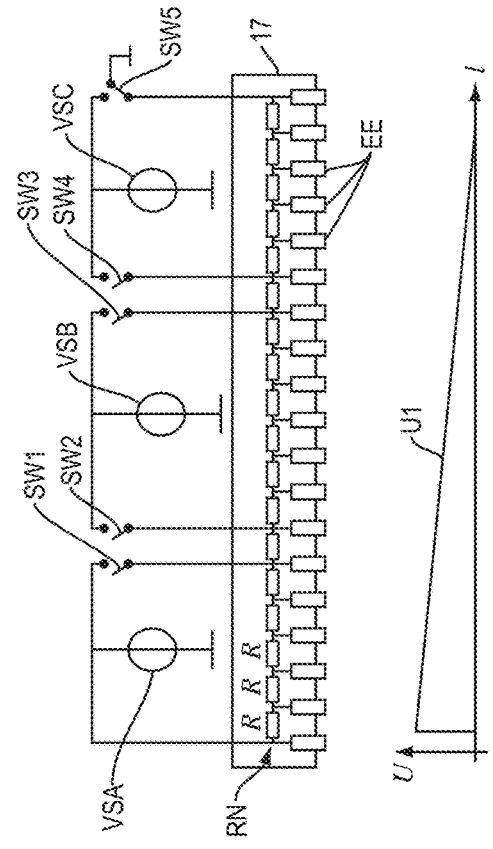
FIG. 4A
FIG. 4B
FIG. 5A
FIG. 5B

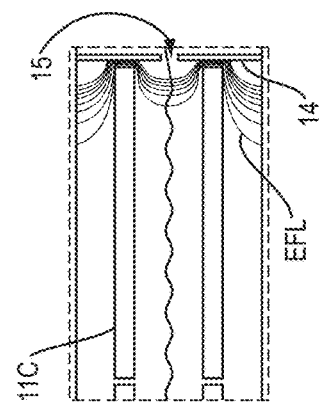
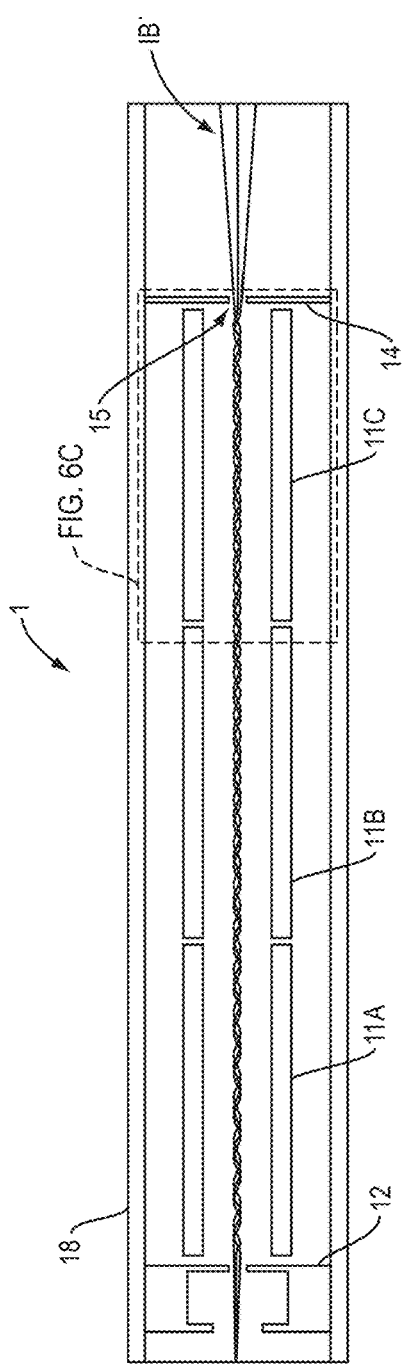
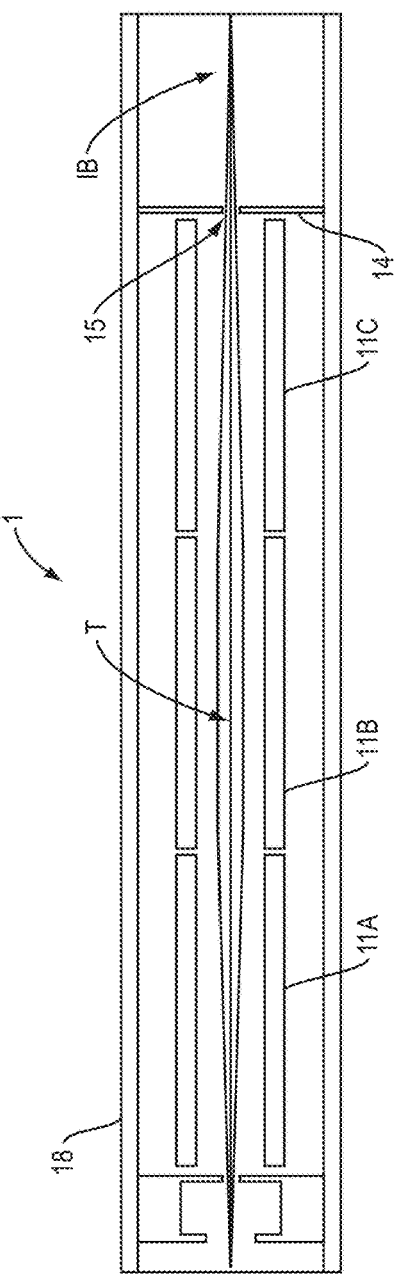

SWITCHABLE ION GUIDE

RELATED APPLICATIONS

This application continuation of U.S. patent application Ser. No. 17/612,092, filed on Nov. 17, 2021. U.S. Ser. No. 17/612,092 is a national stage filing under 35 USC § 371 of PCT International Application PCT/EP2020/064004, Filed May 19, 2020, which claims priority to GB Patent Application 1907171.1, filed May 21, 2019.

FIELD OF THE INVENTION

The present invention relates to isotope ratio mass spectrometry (MS). More in particular, the present invention relates to interference free, high resolution, multi-collector isotope ratio mass spectrometry and elemental analysis in combination with a collision cell and a plasma source, such as an inductively coupled plasma (ICP) source.

BACKGROUND OF THE INVENTION

Multi-collector ICP-MS is an established method for high precision and accurate isotope ratio analysis. Applications are in the field of geochronology, geochemistry, cosmochemistry, biogeochemistry, environmental sciences as well as in life sciences. Precise and accurate isotope ratio measurements very often provide the only information to gain deeper insight into scientific questions which cannot be answered by any other analytical technique. However, elemental and molecular interferences in the mass spectrometer limit the attainable precision and accuracy of the analysis.

These interferences are present in the sample material itself or are generated by sample preparation from a contamination source (used chemicals, cleanliness of sample container, and fractionation during sample purification) or are even generated in the ion source or in the mass spectrometer. The problems with such interferences can be countered by:
1. using a high mass resolution mass analyzer that discriminates against interferences by detecting small differences in mass of the interference relative to the sample ion;
2. by sample preparation and chemical separation of interference prior to mass analysis; and/or
3. by using a collision cell integrated into the mass analyzer.

In a collision cell the chemical interferences are removed by chemical reactions, and/or by kinetic energy discrimination, taking advantage of different cross sections of molecular and elemental species inside the pressurized collision cell which results in different kinetic energy losses of molecular and elemental ions. By means of a high pass energy filter following the collision cell the lower energy molecular species can be discriminated.

A collision cell is an encapsulated volume within the ion optical beam path which is pressurized with a collision gas to cause interactions (i.e. collisions and/or chemical reactions between the ions and the gas molecules). In order to generate efficient collisions and chemical reactions inside the collision cell, the ions preferably are at a low ion beam energy of a few electronvolt (eV) only. The collision cell usually comprises a multipole ion guide which is powered by RF fields to guide the ions through the collision cell. In order to achieve a reasonable gas pressure, the multipole ion guide is encapsulated in a compact volume with small entrance and entrance apertures, typically in the range of 1-3 mm diameter. A collision cell coupled to a multi-collector mass spectrometer is disclosed in British patent application GB 2 546 060 (Thermo Fisher Scientific (Bremen) & The University of Bristol).

Ions having different masses but the same energy travel at different velocities through the time dependent oscillating field of the collision cell and as a result the ion trajectories are mass dependent. In other words, the trajectories depend on the mass of the ions traveling through the RF field. This effect is called "noding". This can in particular pose a problem at the exit of the multipole structure, where ions of different masses may exit at different angles.

The mass dependence of the collision cell transmission can be a problem for accurate isotope ratio measurements, even when it is small. However, for some analytical applications there is no other choice to remove isobar interferences but to use the collision cell.

For samples where no interferences are present it would be advantageous to avoid the low energy passage of the ions through the radio frequency (RF) multipole collision cell optics and to exclude any uncertainty of the discrimination effects caused in the collision cell (i.e. chemical effects as well as the noding effect).

One way to solve this problem is to install a second beam path in the mass spectrometer where the ion beam is deflected off axis prior to the collision cell to bypass the collision cell and finally to deflect the ions back onto the optical axis of the mass spectrometer. Such a dual path ion optics arrangement is described in British patent application GB 2 535 754 (Nu Instruments). It allows to switch between the low energy collision cell beam path and an off axis static high energy beam path. This results into a rather complicated setup with several ion beam deflectors causing image aberrations and alignment problems.

It is further known to operate a collision cell alternatingly in a pressurized mode and in a non-pressurized mode, or low-pressure mode. This approach avoids the complicated set-up of the above-mentioned patent application GB 2 535 754 but it has been found that it introduces other problems, such as focusing of the ions. An RF field may be used to focus the ions passing through a collision cell. An RF field generated by a multipole arrangement, such as a quadrupole, can be used to direct ions towards the center line of a longitudinal multipole arrangement. However, an RF field may introduce the undesired noding effect, as discussed above.

SUMMARY OF THE INVENTION

It is an object of the present invention to provide a collision cell for a mass spectrometer which can be used with and without a collision gas, but which can largely avoid the problems related to RF driven ion optics and which is simpler and more compact than the dual path arrangement of the prior art.

Accordingly, the present invention provides an ion optical arrangement for use in a mass spectrometer comprising:
a collision cell defining an ion optical axis along which ions may pass,
electrodes comprising a set of parallel poles arranged in the collision cell, and
a voltage source for providing voltages to the electrodes to produce electric fields,
wherein the ion optical arrangement is arranged for switching between a first operation mode in which the collision cell is pressurized and a second operation mode in which the collision cell is substantially evacuated, and wherein the ion optical arrangement is further arranged for producing a radio frequency electric focusing field in the first operation mode and a static electric focusing field in the second operation mode.

By providing an ion optical arrangement which is switchable between an operation mode in which the collision cell is pressurized and another operation mode in which the collision cell is not pressurized, the collision cell can remain in the ion optical path (which typically is the ion optical axis) even when it is not used for producing collisions. It will be understood that the terms "pressurized" and "evacuated" (that is, not pressurized) are relative and that actual gas pressures in the collision cell will also depend on the gas pressure outside the collision cell. Accordingly, when the collision cell is substantially evacuated the gas pressure in the collision cell may be very low, for example between $10^{-7}$ mbar and $10^{-3}$ mbar. When the collision cell is pressurized, the gas pressure may be between approximately $10^{-5}$ and $10^{-3}$ mbar. It will be understood that the gas pressure in the "pressurized" mode of operation will be at least one order of magnitude, preferably at least two orders of magnitude, greater than the gas pressure in the "evacuated" mode of operation.

By providing an ion optical arrangement which is capable of producing a radio frequency electric field focusing field in the first operation mode and a static electric focusing field in the second operation mode, it is achieved that the ion beam entering the collision cell can be focused both in the first operation mode and in the second operation mode. Thus, a scattering and therefore a loss of ions is avoided, both in the pressurized operation mode and in the evacuated operation mode.

A static electric focusing field may be produced by supplying a DC (direct current) voltage to suitable electrodes. Therefore, in the ion optical arrangement of the invention, the electric focusing field in the evacuated operating mode is caused by a DC voltage, while the electric focusing field in the pressurized operating mode is caused by an AC (alternating current) voltage, more in particular an RF (radio frequency) voltage.

It is noted that it is known per se to apply a DC bias to the poles of a quadrupole arrangement, the poles or rods of a quadrupole having a uniform non-zero voltage relative to ground. Such an arrangement, however, provides no focusing of the ion beam.

The ion optical arrangement of the invention may comprise an einzel lens for producing the static electric focusing field. An einzel lens, also known as unipotential lens, is an electrostatic lens which focuses a beam of charged particles. An einzel lens may consist of at least three substantially tubular electrodes in series, to which different voltages are applied. Typically, if the einzel lens has three electrodes, a high voltage may be applied to the middle electrode while a low voltage may be applied to the first section and the third section. By providing an einzel lens, a simple yet effective structure for focusing ions in the evacuated operation mode is obtained.

In the ion optical arrangement of the invention, an einzel lens may be implemented in several ways. In an embodiment, at least two of the poles may each be partitioned in at least three electrically isolated sections consecutively arranged along a longitudinal axis of the pole, the voltage source being arranged for supplying different direct current voltages to adjacent sections of a pole in the second operation mode.

By segmenting a multipole arrangement into at least three sections, the multipole arrangement can be used to form an einzel lens. This embodiment has the advantage that no additional parts are needed to form the einzel lens. The multipole arrangement can additionally be used to provide the RF electric focusing field by supplying an RF voltage to all three sections of each pole. The multipole arrangement may comprise a quadrupole, a hexapole, or an octupole, for example.

The direct current voltages supplied to a first and a third section of a pole may be substantially equal, while the direct current voltage supplied to a second section of a pole may be a different voltage. The voltage supplied to the second section of a pole is different from and preferably has a greater amplitude (positive or negative) than the other voltages. In this way an einzel lens function can be achieved, the middle section of the poles producing a stronger electric field than the other sections. The voltages supplied to all three sections are preferably non-zero voltages.

The ion optical arrangement of the invention may further comprise a voltage source for providing a radio frequency voltage in the first operation mode and a DC voltage in the second operation mode to the pole sections.

The ion optical arrangement may comprise a number of parallel poles or rods serving as electrodes for providing the radio frequency electric field and/or the static electric field, the number of parallel rods preferably being at least four, more preferably six. Thus, the ion optical arrangement may comprise a quadrupole or hexapole, or possibly an octupole.

The ion optical arrangement according to the invention may additionally comprise a number of vanes arranged in spacings between adjacent rods and serving as electrodes for providing a static electric field. Such vanes are known per se and may be used to apply axial electric fields, typically axial electric fields having a field gradient. When used in conjunction with a multipole arrangement, they may be referred to as auxiliary electrodes.

In accordance with an aspect of the invention, each vane may be partitioned into at least three electrically isolated sections consecutively arranged along a longitudinal axis of the vane. In addition, the voltage source may be arranged for supplying different direct current voltages to adjacent sections of a vane in the second operation mode. In this way, the ion beam may be focused by an einzel lens, as in the embodiment in which the rods are partitioned into sections. When the vanes are partitioned into consecutive sections, the rods may not be partitioned into sections and may therefore be integral. However, in some embodiments, both the rods and the vanes may be partitioned into sections and different voltages may be applied to at least some of the sections of the rods and/or of the vanes.

Each vane may be partitioned into two or three sections, but vanes partitioned into more than three sections, such as four or five sections, may also be used. Each vane may additionally, or alternatively, comprise a series arrangement of resistors for providing a voltage gradient. Thus, when a voltage is applied over the entire length of the vanes, a voltage gradient will be caused by the series arrangement of resistors, and hence an electric field gradient. Thus, the voltage source may be arranged for providing a uniform voltage gradient over the entire length of a vane in the first operation mode. However, the voltage source may also be arranged for providing a uniform voltage to each section, in which case the series arrangement of resistors is not used to provide a voltage gradient.

In the ion optical arrangement according to the invention, the first operation mode may be a low energy mode and the second operation mode may be a high energy mode, depending on the energy of the ion beam. The boundary between the low energy mode and the high energy mode may depend on the particular application. The low energy mode may involve an axial energy of 100 eV or less, for example 30 eV or less. The high energy mode may involve an axial energy of more than 30 eV, for example more than 100 eV.

According to a further aspect of the invention, the so-called noding effect may be suppressed or be virtually eliminated. To this end, the voltage source may be arranged for varying the radio frequency electric field in the first operation mode to change the number of oscillations of ions in the ion optical arrangement. By varying the RF frequency of the voltage supplied to the rods or other electrodes, the number of oscillations of the ions due to the RF field may be altered and the noding effect may be reduced.

Similarly, the voltage source may be arranged for superimposing a frequency upon the static electric field produced by the vanes and/or the poles to control the number of oscillations of ions in the ion optical arrangement in the second operation mode.

It is noted that the ion optical axis may be straight but that this is not essential. In some embodiments, the ion optical axis through the collision cell is straight but the path of the ions through the ion optical arrangement may not be straight and may be partially or entirely curved, as in the arrangement of GB 2 546 060, for example.

The ion optical arrangement according to the invention may further comprise a pump for pressurizing the collision cell at least during the first operation mode and a pressure release mechanism for releasing gas pressure when switching from the first operation mode to the second operation mode. The pressurizing pump may be switched off in the second operation mode. In some embodiments, the pump may be reversed in the second operation mode. In an embodiment, the ion optical arrangement may comprise a switchable pumping cross section in the collision cell housing for establishing a higher gas pressure inside the first operation mode (low cross section) and pumping the collision cell efficiently in the second operation mode (high cross section).

Various pressure release mechanisms may be used. In an embodiment, the pressure release mechanism may comprise a valve operated by a Bourdon tube so as to pneumatically operate the pressure release mechanism. A Bourdon tube typically consists of a rounded or wound tube which straightens when inflated. In another embodiment, the pressure release mechanism may comprise a relay so as to electrically operate the mechanism. In some embodiments, a Bourdon tube and a relay may advantageously be combined.

In an embodiment, the pressure release mechanism comprises an electrostatic mechanism which also allows to electrically operate the mechanism.

The electrostatic mechanism preferably comprises an insulating foil provided with a conducting layer, which insulating foil covers at least one opening in the collision cell when a first voltage is applied and is spaced apart from the at least one opening when a second voltage is applied. Thus, the insulating foil can be moved towards and away from openings in the housing of the collision cell by applying suitable voltages.

The present invention further provides a mass spectrometer comprising an ion optical arrangement as described above. The mass spectrometer may further comprise at least one ion source, such as an inductively coupled plasma (ICP) ion source, and at least one detector arrangement, such as a multi-collector detector arrangement. The mass spectrometer preferably also comprises a mass filter, which may be a quadrupole mass filter, for example, or a magnetic sector mass filter.

The present invention additionally provides a method of filtering ions using a collision cell, the ions following a trajectory including an ion optical axis passing through the collision cell, the method comprising switching between a first operation mode in which the collision cell is pressurized, and a second operation mode in which the collision cell is substantially evacuated, the method further comprising producing in the collision cell a radio frequency electric field focusing field in the first operation mode and a static electric focusing field in the second operation mode.

The method preferably comprises using an einzel lens for producing the static electric focusing field. The einzel lens may be provided by electrically isolated sections of a multipole arrangement to which at least two different DC voltages are supplied, and/or by electrically isolated sections of vanes or other (typically longitudinal) electrodes which may be arranged in the spacings between the poles of a multipole arrangement.

The first operation mode may be a low energy mode while the second operation mode may be a high energy mode. That is, the ions passing through the collision cell may have a relatively low energy in the first operation mode when gas is present and a relatively high energy in the second operation mode, when virtually no gas is present.

The method may further comprise operating a valve when switching between the first operation mode and the second operation mode, thus allowing gas to enter or to leave the collision cell.

The present invention yet further comprises a software program product for carrying out the method described above, in particular for causing a processor to control the switching between operation modes and/or to control the voltage source so as to produce electric focusing fields. The software program product may comprise a tangible carrier on which instructions are stored which allow a processor to carry out steps of the method.

BRIEF DESCRIPTION OF THE DRAWINGS

FIG. 4A schematically shows a multipole arrangement provided with partitioned vanes being used in an RF operation mode in accordance with the invention (see also FIG. 5A).

FIG. 4B schematically shows the multipole arrangement according to FIG. 4A being used in a DC operation mode in accordance with the invention (see also FIG. 5B).

FIG. 5A schematically shows a circuit for producing an axial voltage gradient in the multipole arrangement of FIG. 4A, together with the associated voltage.

FIG. 5B schematically shows the circuit of FIG. 5A when used for producing einzel lens voltages in the multipole arrangement of FIG. 4B.

FIG. 6A schematically shows a partitioned multipole arrangement according to the invention used in RF mode.

FIG. 6B schematically shows a simulation of a partitioned multipole arrangement according to the invention used in DC mode.

FIG. 6C schematically shows the electric field near the ends of the poles of FIG. 7A.

DETAILED DESCRIPTION OF PREFERRED EMBODIMENTS

Figure 1:
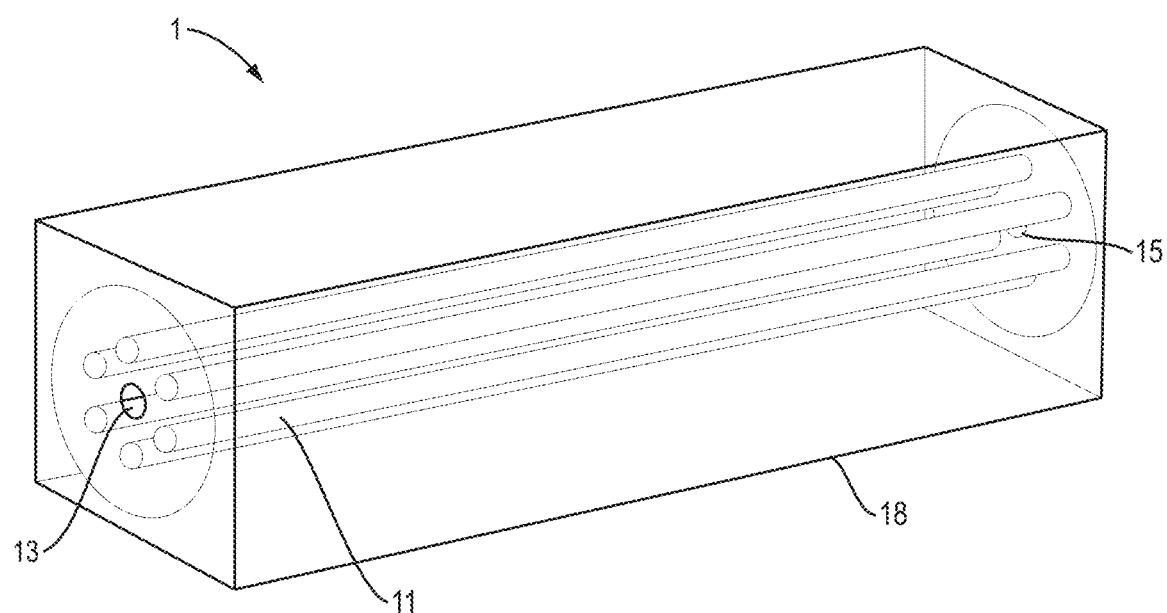
FIG. 1 schematically shows a multipole collision/reaction cell in which the invention may be utilized.

As mentioned above, it is an object of the present invention to provide an ion optical arrangement comprising a collision/reaction cell, which ion optical arrangement is suitable for use in a mass spectrometer, in which the collision/reaction gas can be used only when necessary, while avoiding the relatively complicated dual path ion optics arrangement described in British patent application GB 2 535 754. It is another object of the invention to reduce the noding effect in an ion optical arrangement, such as a collision/reaction cell.

In accordance with the invention, the first object may be achieved by switching the operation modes of the ion optical arrangement between:
 A. a first operation mode including a pressurized collision cell, and
 B. a second operation mode along the same optical axis with an evacuated collision cell.

This switching between operation modes can be achieved without exchanging any components, that is, by using the components present in the ion optical arrangement.

The first operation mode uses a radio frequency (RF) electric focusing field while the second operation mode uses a static (DC) electric focusing field. The first mode of operation can be a low energy RF operation mode while the second mode of operation can be a high energy static operation mode.

In GB 2 546 060, which is herewith incorporated by reference in this document, the concept of a pre-mass filtered collision cell interfaced to a multi-collector mass spectrometer is disclosed. An RF quadrupole pre-mass filter is used which also introduces noding effects similar to the RF collision cell. In the collision cell the ion beam trajectories are altered by the collisions and the strong phase correlation to the oscillating RF field of the ions traveling through the quadrupole is disturbed by the collisions and thus leads to less mass dependent transmission effects.

The small dependence of the trajectories depending on the mass is known as "noding". It is a result of the spatial oscillations of the ions inside a multipole. Depending on the number of oscillations of the ions, they leave the cell with an angle/position vector that is mass dependent. This effect can be amplified by the tuning parameters such as the potentials of the entry and exit lenses which determine the input and exit parameters of the ion beam entering and exiting the collision cell. The DC bias potential of the multipole rods also determines the travel velocity of the ions through the collision cell and has an influence on the noding.

By using higher order multipoles, from quadrupoles (4 poles) to hexapoles (6 poles) or octupoles (8 rods or poles), higher order oscillations are added to the ion trajectories which make the mass dependent differences of the trajectories less pronounced and which at the same time increase the acceptance input aperture of the collision cell. However, this beneficial effect is limited.

The pressurization of the collision cell by introducing a collision gas (e.g. helium) flow in the order of several ml/min results in multiple collisions of the ions with the collision gas, which in turn results in scattering and random movements of the ions. These scattering events further reduce the phase correlation of the ion beam trajectories to the oscillating RF field and thus reduce the noding effect. The more collisions the ions undergo the smaller the noding effect is. Especially for heavier ions multiple collisions result into both a reduction of the kinetic energy and a reduction of the energy spread of the ions, which improves the focusing conditions and which is known as collisional focusing.

The momentum transfer per collision becomes more efficient the more the difference in mass between both collision partners is reduced and might even stop the movement of the ions. For lighter masses approaching the low mass range of helium (He), the overall transmission efficiency through the pressurized collision cell is significantly reduced. This can partly be compensated by adding an axial electrical field gradient to the cell potential that actively drags ions from the entry to the exit aperture and therefore allows for an increased number of collisions as well as for higher transmission for lighter ions.

The noding effect can be reduced by using higher order multipoles with high gas pressures and axial fields, but it cannot be eliminated completely. Accurate and precise isotope ratio measurements using collision cells requires the availability of a calibrated standard and extensive calibration procedures. Tuning parameters need to be controlled carefully.

The invention provides a collision cell that can be switched to a static high energy DC transfer lens to completely avoid noding effects. Collision cells usually require high gas pressure inside the collision cell volume to induce sufficient collisions and chemical reactions (when a reaction gas is used). Therefore, the pumping apertures at the entrance and the exit are usually rather small, in the order of 1-3 mm diameter. For an efficient high energy transport through the collision cell arrangement, an improved pumping mechanism has to be established.

The present invention additionally provides a solution to the noding problem by providing a collision/reaction cell that varies the number of oscillations the ions undergo in the RF field. That can be done by:
 1. a variation of the RF frequency, and/or
 2. a variation of the ions' energy/velocity in axial direction, and/or
 3. any other lens element that influences the ion velocity.

The variation of the axial energy can be achieved by, for example, superimposing an oscillation on the rod bias voltage (DC potential of the rods that defines the energy the ions have in the multipole) and/or by applying an oscillating voltage to the vanes (which may also be referred to as drag electrodes in some embodiments, see FIGS. 4A & 4B).

The amplitude of the applied variation is preferably such that the number of oscillations which the ions undergo changes by at least 1 over the length of the collision cell. As mentioned above, the number of oscillations n is given by the frequency and the velocity of an ion:

$$n = f \cdot l \cdot \sqrt{\frac{m}{2E}}$$

with
- f=frequency,
- l=length of multipole,
- m=ion mass, and
- E=ion energy.

In an embodiment, the minimum number of oscillations is in the order of 10 (f=1 MHZ, l=100 mm, m=7 amu and E=5 eV). Hence the frequency variation should be at least 10 percent (it is noted that the number of oscillations n is directly proportional to f) or the energy variation should be at least 20 percent.

The solution to the collision cell problem consists of a collision/reaction cell that can be operated in two modes. In a first mode the collision cell is driven with electrical RF fields at low beam energy and high gas pressures in the collision cell mode. In a second mode the collision cell uses DC fields at high beam energy and low gas pressures.

In the RF mode the rods may be driven in two groups. The first group is connected with one of the two RF outputs and the other group of rods is connected with the other RF output (180° phase shifted with respect to the first output, see the rods 11 and 11' in FIG. 2A). The rods of the multipole are aligned to the optical axis of the ion optics. The optical axis can be straight or curved. Due to the alternating potential of the rods the ions are actively refocused into the center of the setup. Without the focusing nature of the RF field the ions would be strayed by the collisions with the gas in the cell.

In the DC mode the setup is driven substantially without gas and at a high beam energy. Therefore, a focusing RF field is not necessary. In accordance with the invention, the RF rods are segmented in at least two or three sections along the optical axis and the setup is switched to DC only mode such that effectively it works as an einzel lens.

Since an einzel lens consists of three cylindrical elements that are placed coaxially on the center axis, the rods may be partitioned into three parts or sections. With such a setup both the RF-field of the multipole as well as the DC potentials of the einzel lens can be applied. Beside the einzel lens concept with three segments a DC-only mode is also possible with just two segments.

In the DC mode the ions can have a much higher energy compared to the RF mode. Ion optics for ion beams with low energy are difficult to focus since the high charge density of the beam leads to a radial space charge expansion of the beam (space charge effects). Ion beam energies of several thousand eV minimize space charge effects and allow beam focusing at high ion beam currents. With the einzel lens arrangement according to the invention the ions stay at energies in the keV (kilo electronvolt) range and thus space charge effects are much reduced compared to beam energies of a few eV.

The described principle of segmenting a multipole lens in order to switch between low energy RF mode and high energy DC mode can be applied not just to a multipole collision cell arrangement but also to a quadrupole mass spectrometer or any other RF multipole arrangement.

This invention allows to switch a low energy RF mode ion optical setup to a high energy DC mode setup along the same optical axis.

Since the two described modes can be altered just by applying different potentials to the lenses, the limiting factor for the switching time is most likely the gas pressure in the housing of the cell. For the RF mode the housing is ideally completely sealed with small (1-3 mm) diameter apertures at the entry and the exit of the collision cell housing. For the operation in the high energy DC einzel lens mode an increased pumping cross section is required to efficiently pump out residual gas as memory from a previous experiment where the arrangement has been operated as a low energy high pressure collision/reaction cell.

The suggested techniques do not require expensive mechanical feed-throughs. In the first case the movement inside the vacuum is induced via a steel capillary. In the second case an electrical feed through is sufficient to induce the movement inside the vacuum. The altered potential of the foil might be combined with the potential of one of the lenses.

Accordingly, the invention provides at least the following advantages:
- Switching between high energy DC einzel lens ion optics and low energy RF multipole lens ion optics without intervention to the vacuum system.
- Switching may be done by switching electronic supplies only.
- The high pressure collision cell may be operated by a mechanical switch to increase pumping efficiency in case of high energy and high vacuum DC operation mode.
- Proposed multipole arrangement of hexapole or octupole or even higher order reduces noding effects.
- There is only one optical axis in the system (no bypass optical axis). This allows a compact geometry and reduced aberrations.
- Since there is only one ion optical axis, the tuning of the system is much easier compared to a complicated deflection setup where the ion beam has to be steered along a bent bypass axis to circumvent the collision cell or vice versa.
- The principle of a segmented multipole lens also can be applied to a quadrupole mass filter lens. This allows the ion optical instrument to be switched from a low energy front-end RF multipole lens design to a high energy DC lens design without any noding effects.
- The high energy DC mode gives higher sensitivity and thus overcomes the limitations of a low energy multipole setup.
- The switching between the two modes allows to configure a unique instrumental setup which allows to switch to the collision mode for specific applications only and to run the same instrument in the high energy DC mode simply by switching electric power supplies.

FIG. 1 schematically shows a collision cell according to the prior art. The collision cell 1 is shown to comprise a housing 18 in which a multipole arrangement is accommodated. In the example shown, the multipole arrangement is a hexapole arrangement comprising six elongate poles or rods 11 which constitute electrodes. A radio frequency (RF) voltage may be fed to opposite pairs of poles 11 to produce an RF electric field. Ions can enter the collision cell through an entrance aperture 13 and leave the collision cell through an exit aperture 15. The RF field produced by the multipole arrangement focuses the ions on the longitudinal axis of the arrangement. This is particularly relevant when a collision gas is present in the collision cell, as collisions may cause the ions to deviate from their path.

Figure 2B:
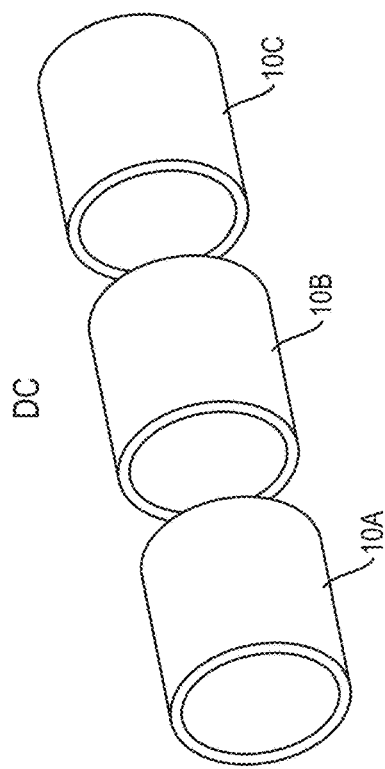
FIG. 2B schematically shows the principle of an einzel lens to which DC voltages can be applied.
Figure 2A:
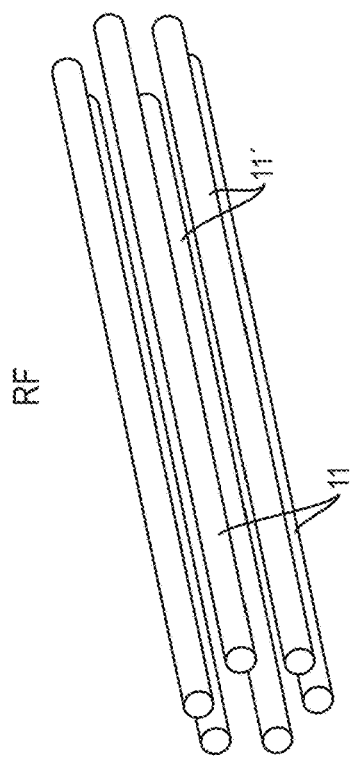
FIG. 2A schematically shows a multipole arrangement according to the prior art to which RF voltages can be applied.

FIG. 2A shows a multipole arrangement, in the example shown a hexapole arrangement, without a collision cell. As in FIG. 1, RF (radio frequency) voltages may be applied to the alternating rods 11 and 11' to generate an RF field in the arrangement that focuses ions and guides them through the arrangement. The RF field may be applied when the collision cell is pressurized. It is noted that such a multipole arrangement may not only be used in a collision cell but also in a mass filter, for example.

When the collision cell is not pressurized, or at least has a lower pressure due to which the influence of the gas on the ion trajectories is reduced, the ions can have a higher energy and the RF field is not required to guide the ions. Instead, in accordance with the invention a so-called einzel lens may be used to guide the ions.

FIG. 2B schematically shows an ion optic einzel lens consisting of three consecutive tube sections or rings 10A, 10B & 10C which are electrically isolated relative to each other. A first section 10A may have a first voltage V1, the second section 10B may have a second voltage V2, while the third section V3 may have a third voltage V3. In some embodiments, the first voltage V1 and the third voltage V3 may be substantially equal, for example both may be equal to −1 kV. The second voltage V2 may then, for example, be equal to −2 kV. Depending on the polarity of the ions, positive voltages may be used instead, for example +1 kV, +2 kV and +1 kV respectively. It will be understood that other voltages may also be used, depending on the ions and the dimensions of the multipole arrangement. In some applications, the second voltage V2 may be equal to +1 kV, +5 kV, −1 kV or −5 kV, for example. Exemplary trajectories of ions passing through such an arrangement will later be explained in more detail with reference to FIG. 6B.

Figure 3B:
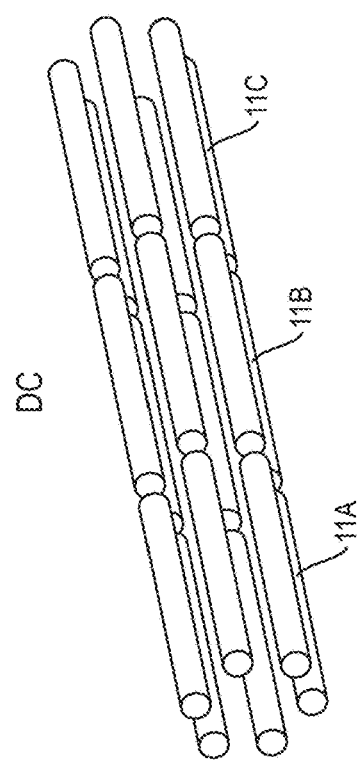
FIG. 3B schematically shows an embodiment of an einzel lens arrangement according to the invention.

It has been found that it is impractical to combine the rods 11 and the rings 10A-10C in the same collision cell or other multipole arrangement. In accordance with the invention, therefore, the rods 11 and the rings 10A-10C are combined into a single structure, which is schematically shown in FIGS. 3A & 3B.

Figure 3A:
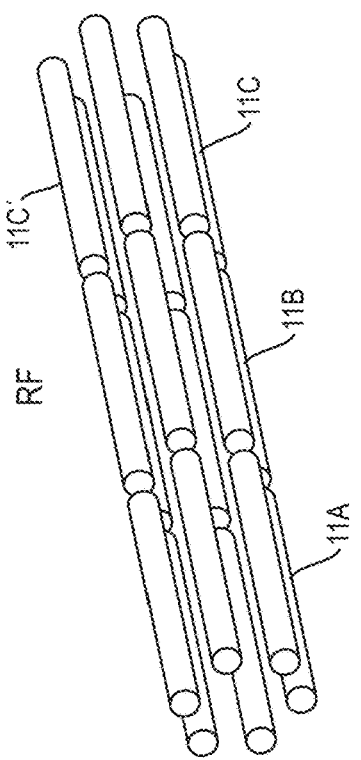
FIG. 3A schematically shows a multipole arrangement according to the invention to which RF voltages are applied.

FIG. 3A shows a multipole arrangement according to the invention. In the embodiment of FIG. 3A, the rods have been partitioned into sections 11A, 11B and 11C (and similarly into 11A', 11B' and 11C'). In the mode of operation illustrated in FIG. 3A, the rods function as the rods 11 in FIG. 2A and all three sections of each rod carry the same RF voltage. In this respect, there is no functional difference with FIG. 2A. However, in the mode of operation illustrated in FIG. 3B, a different DC voltage is applied to consecutive ones of the rod sections 11A, 11B and 11C, so that the rods are used in the same way as the rings 10A, 10B & 10C of FIG. 2B. That is, the rod sections 11A-11C can be said to simulate the rings 10A-10C. In this way, the rods are used to constitute an einzel lens. It is noted that in the mode of operation of FIG. 3B the RF voltage of FIG. 3A is typically not applied. In the embodiment of FIGS. 3A and 3B, the einzel lens structure is constituted by segmented rods. Alternatively, or additionally, it is possible to provide an einzel lens structure by using other segmented electrodes, such as vanes which are often provided in the spacings between the rods of a multipole arrangement. Vanes are typically longitudinal, flat electrodes which may be used to provide axial fields, such as drag fields. By segmenting vanes instead of, or in addition to segmenting rods, an einzel lens structure can also be achieved.

FIGS. 4A & 4B schematically show segmented electrodes, constituted by vanes, arranged between the rods of a multipole lens arrangement, while FIGS. 5A & 5B schematically show voltage generation circuits and the resulting voltages. FIGS. 4A & 5A correspond with a first or RF operation mode while FIGS. 4B & 5B correspond with a second or DC operation mode.

In FIG. 4A, the multipole rods 11 are supplied with RF voltages. The vanes 17 (that is, 17A, 17B & 17C together) are in the example shown used for creating an axial electric field gradient which causes a drag force. Depending on the direction of the field gradient, the drag force either accelerates or decelerates the ions passing through the multipole arrangement. Here a positive potential gradient is applied to the electrodes that induces a field gradient in the center of the arrangement. By this gradient the ions are pulled towards the exit (that is, accelerated), even when they almost have come to rest due to complete momentum transfer to the collision gas. The potential gradient can be created by two potentials that are applied on each side of the electrodes in combination with a resistor chain on the electrodes or with a homogeneous resistance of the material itself, as will be explained with reference to FIGS. 5A & 5B.

FIG. 4B shows the same setup with three potentials applied along the segmented vanes 17, as illustrates in FIG. 5B. With a potential being applied at the entrance side and at the end of the first segment 17A, a constant potential is applied to the first segment. The other two potentials are applied to the second segment 17B and the third segment 17C respectively. In the second or DC operation mode, the RF power supply for the multipole rods is typically switched off, the rods may be grounded or a DC potential may be supplied to them.

FIGS. 5A & 5B schematically show how suitable voltages may be applied to the vanes in the respective operation modes. Each vane 17 (comprising the vane sections 17A, 17B & 17C) is shown to comprise a resistor network RN which includes electrode elements EE coupled by a series arrangement of resistors R. For each section 17A, 17B & 17C a respective voltage source VSA, VSB & VSC is provided, which can be connected to the resistor network RN via a number of switches SW1 to SW5. It is noted that the three vane sections 17A, 17B & 17C are combined here into a single physical vane 17 which, however, is shown to have three distinct (but electrically connected) electrical sections, each having its own voltage source.

In the first operation mode shown in FIG. 5A, the switches SW1 to SW5 are all open. The first voltage source VS1 supplies a voltage to the first resistor and hence to the entrance end (which may typically be arranged near a collision cell entrance 13, for example, see FIG. 1) of the vane 17A. Switch SW5 connects the last resistor and hence the exit end (which may typically be arranged near a collision cell exit 15, for example, see FIG. 1) of the vane 17C to ground. As a result, there is a voltage or potential gradient U1 along the length I of the combined vane 17A-17C, as shown in FIG. 5A. This voltage gradient U1 produces an electric field gradient between the poles 11 of the multipole arrangement (see FIG. 4A).

In the second operation mode shown in FIG. 5B, the switches SW1 to SW5 are all closed. The first voltage source VS1 supplies a first voltage to the first vane section 17A, the second voltage source VS2 supplies a second, different voltage to the second vane section 17B while the third voltage source VS3 supplies a third voltage to the third vane section 17C. In the example shown in FIG. 5B, the first voltage and the third voltage are substantially equal, while the second voltage is higher than both the first and the third voltage. This voltage distribution U2 causes the vane sections to act as an einzel lens.

FIG. 6A schematically shows a multipole arrangement of a collision cell 1 according to the invention in a first operation mode, in which the rods are used as an RF multipole. The collision cell 1 is shown to have a housing 18, in which the multipole arrangement is accommodated. The collision cell 1 is further shown to comprise an entrance electrode 12 and an exit electrode 14, which comprises an exit opening 15. All three segments 11A, 11B & 11C of each rod have the same DC voltage in this first or RF operation mode, as in FIG. 3A. This DC voltage may or may not be equal to zero (ground).

In the partially expanded FIG. 6C it can be seen that the ions do not follow straight lines but have oscillating trajectories. It can also be seen, as shown in FIG. 6A, that the ions fan out evenly at the exit opening 15. This is the suppressed noding effect that may occur in the RF operation mode and which will later be discussed in more detail. The electrical field lines EFL are also schematically shown in FIG. 6C.

FIG. 6B schematically shows the same ion guide as in FIG. 6A, but where different DC voltages are applied to each of the sections of the rods, as in FIG. 3B, so as to provide an einzel lens. An RF voltage is not applied in FIG. 6B. The trajectories of the ions (three different trajectories T are shown) depend on the entrance angles but no longer on the substantially random parameters as in the RF operation mode shown in FIG. 6A. The DC voltages that may be used are, for example, between −1 kV and −2 kV at a beam energy of 2 keV (high energy). It can be seen that the einzel lens causes ions having different trajectories to pass through the exit opening 15. The einzel lens can therefore be said to focus the ions in the second or DC operation mode, in which the ions may have a high energy.

It is noted that according to another aspect of the invention, the collision cell may be heated to reduce so-called memory effects. That is, by heating the collision cell to a temperature of, for example, 50° C., stray ions are less likely to remain on the electrodes (rods and/or vanes) and on the inner walls of the collision cell. It will be understood that stray ions which remain behind in an experiment may detrimentally influence any further experiment. A suitable temperature range is 40° C. to 70° C., preferably 45° C. to 55° C. Heating a collision cell is preferably achieved using electric heating.

Figure 7:
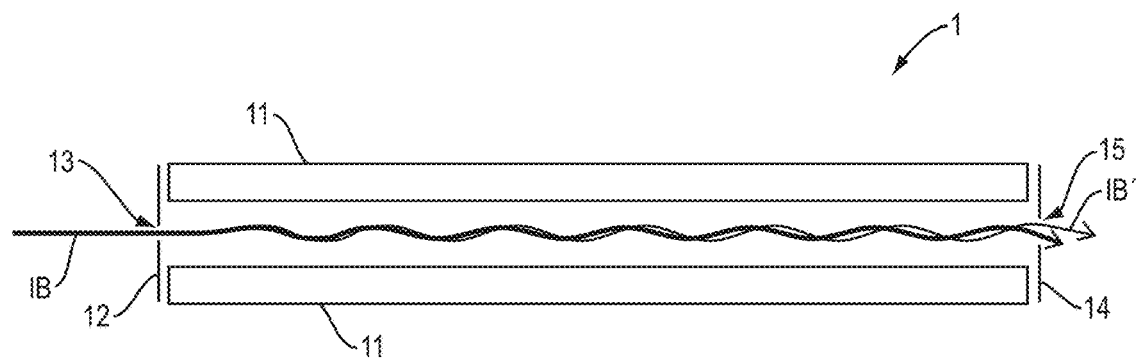
FIG. 7 schematically shows a multipole arrangement where noding occurs.

As mentioned above, a problem that may arise in a multipole arrangement is noding. This effect is illustrated in FIG. 7. A multipole arrangement, which may be part of a collision cell 1 or of a mass filter, comprises rods or poles 11, to which an RF voltage may be applied. An entrance electrode (front plate) 12 is provided with an entrance opening 13 for letting an ion beam IB enter the multipole arrangement. An exit electrode (back plate) 14 is provided with an exit opening 15 for letting the (modified) ion beam IB' exit the multipole arrangement.

As can be seen, some ions follow slightly different trajectories, resulting in the modified ion beam IB'. While the original ion beam IB was substantially uniform, the ion beam IB' exiting the multipole arrangement is no longer uniform, different ions exiting at slightly different angles. The trajectories shown in FIG. 7 are of ions having the same energy but different masses. Since different masses follow different trajectories, the probability that ions pass through the exit opening 15 (instead of hitting the end plate 14) is also mass dependent. In addition, the focusing of the ions emerging from the multipole arrangement in a subsequent ion optical device (such as a mass analyzer) may also become mass dependent. It will be clear that this is undesirable. In embodiments of the invention, therefore, the RF frequency of the voltage supplied to the rods is varied. That is, the RF frequency is not kept constant but is changed over time. Frequency changes of at least 10% are preferred, although smaller frequency changes such as 5% may in some embodiment also be used, also depending on the length of the multipole arrangement. Frequency changes of 15% or 20% may, however, be more effective in some multipole arrangements. That is, at an RF frequency of 1 MHz, for example, the frequency is preferably made to vary at least from 0.90 MHz to 1.10 MHz (−10% and +10%). The resulting RF frequency may vary over time in various ways: sawtooth, square or sinusoidal, for example.

Instead of, or in addition to changing the RF frequency to reduce the noding effect, it is also possible to superimpose a (preferably RF) frequency upon any DC bias voltage that is supplied to the multipole arrangement, even when the DC bias voltage is zero.

As mentioned above, an aspect of the invention is operating a collision cell in a pressurized mode and in an evacuated (that is, non-pressurized) mode. This requires that the collision cell can be pressurized and depressurized rapidly. In particular, a pressure release mechanism is desired that is fast and effective.

According to an aspect of the invention, therefore, valve mechanisms are provided which are particularly suitable for use in a collision cell having a pressurized and an evacuated operation mode, such as, but not limited to, the collision cell of the present invention.

Figure 8A:
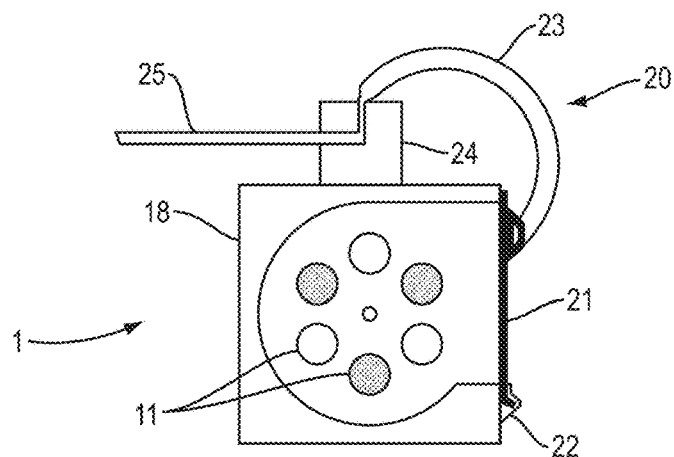
FIGS. 8A & 8B schematically show an embodiment of a pneumatic pressure release mechanism in accordance with the invention.
Figure 8B:
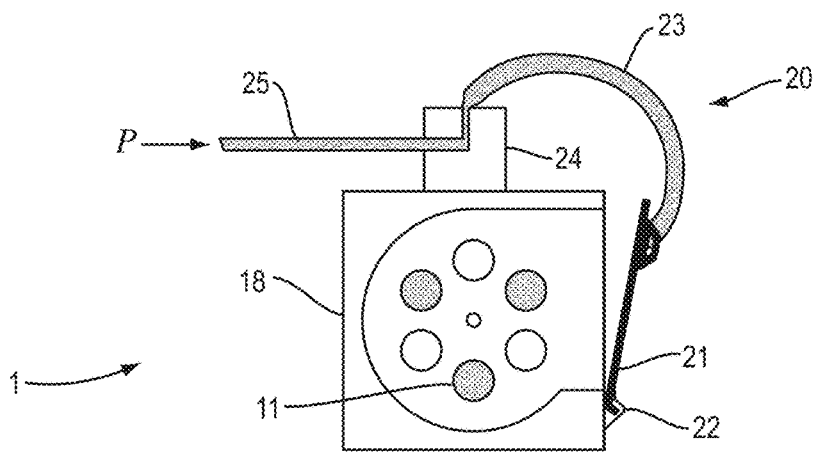

FIGS. 8A & 8B show a mechanism 20 for adjusting the pumping cross section of a collision cell housing 18 having rods 11. The mechanism 20 is shown to comprise a door or flap 21 which is connected via a hinge 22 to the housing 18 of the collision cell 1. The flap 21 can be operated by an actuator 23 of which one end is connected to the flap 21 and the other end is connected to a support element 24 attached to the housing 18.

The actuator 23 shown in FIGS. 8A & 8B is a Bourdon tube. A Bourdon tube comprises a bent tube. The bending radius of the bent tube can be decreased if the pressure difference between the inner part and the outer part of tube increases. To this end, a gas tube 25, which is also connected to the support element 24, is connected with the actuator 23. In the embodiment shown, the gas flows from the gas tube 25 through a channel in the support element 24 into the actuator 23 when the gas pressure in the gas tube 25 is higher than the gas pressure surrounding the actuator 23. By letting gas flow into the actuator, its bending radius decreases (the actuator straightens) and the flap is opened. Conversely, the gas flows from the actuator 23 through the support element 24 into the gas tube 25 when the gas pressure in the gas tube 25 is lower than in the actuator 23. By letting gas flow out of the actuator, its bending radius increases (the actuator curves) and the flap is closed.

Thus, by providing a pressure difference between the gas tube 25 and the air (or other gas) outside the actuator 23, the flap can be quickly opened or closed, thus allowing the gas pressure in the interior of the collision cell 1 to quickly assume the gas pressure on its outside.

It is noted that the collision cell 1 may be accommodated in a near-vacuum environment, while the gas tube may be connected with an environment under atmospheric pressure. The gas used for inflating the inflatable actuator may be air. As the interior volume of the actuator 23 and the gas tube 25 may be small, only a small amount of air or other gas is needed to inflate the actuator. This air or other gas may be provided by a gas reservoir or by a pump. Thus, a small pump or valve can be sufficient to indirectly operate the relatively large flap.

By using a Bourdon tube or similar actuator, a fast and effective pressure regulation of a collision cell can be achieved. However, a Bourdon tube is not the only type of actuator that may be used in a collision cell or similar pressurized chamber, as will be further explained with reference to FIG. 9.

FIG. 9 schematically shows an electrostatic opening mechanism used in a collision cell. The collision cell 1 is shown to comprise a housing 18 in which rods 11 are accommodated. An ion beam IB can pass through the collision cell 1, through openings in the front plate 12 and back plate 14 respectively. In the embodiment shown, part of the wall of the housing 18 is provided with through holes 16 which can be closed off by a movable foil. This foil is located in a spacing between the housing 18 and a plate 19. Both the housing 18 and the plate 19 contain electrically conductive material and may both be made of metal, or at least contain a metal layer or other conductive layer. The plate 19, which extends substantially parallel to the housing 18, may be flat but may alternatively be curved to accommodate any curvature of the housing 18.

In the embodiment shown, the foil comprises two layers: a conductive layer 30 and an electrically insulating layer 31. A further electrically insulating layer 32 is attached to the plate 19. In an alternative embodiment, the foil consists of three layers: the conductive layer 30 and both insulating layers 31 & 32. Further layers may be added, as long as the foil remains sufficiently flexible. A suitable material for the insulating layers 31 & 32 is Kapton, but other materials, for example other polyimides, may also be used. The conductive layer may be made of copper foil, for example.

Figure 9A:
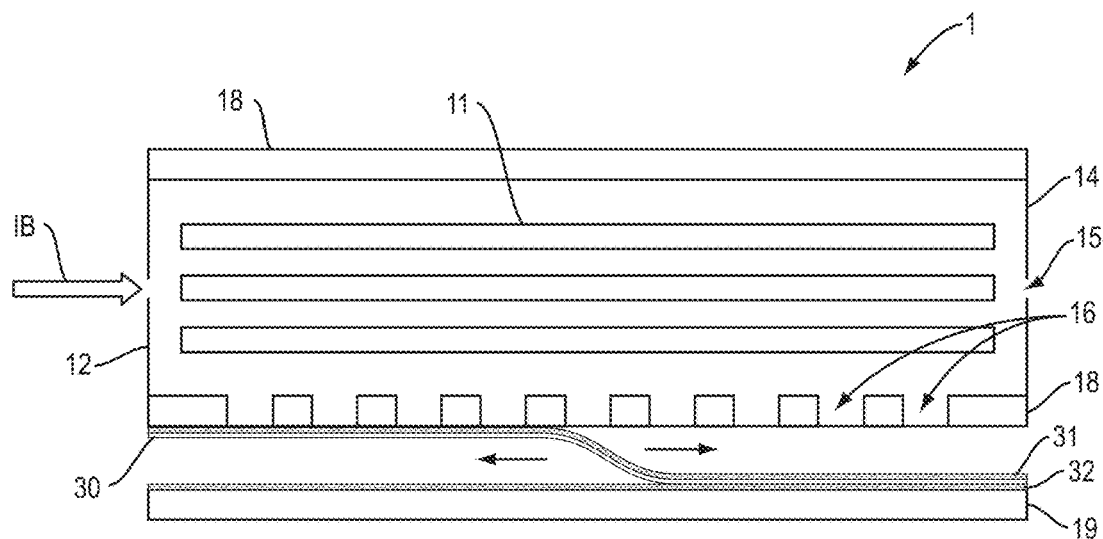
FIGS. 9A-9C schematically show an embodiment of an electrostatic pressure release mechanism in accordance with the invention.

As mentioned above, the flexible foil is located in the spacing between the housing 18 and the plate 19. One edge of the foil may be attached to the housing 18 while the opposite edge may be attached to the plate 19, such that the foil bridges the spacing. By applying DC voltages to the conductive layer, the position of the foils can be changed, as shown in FIG. 9A by the arrows which indicate the possible movement of the substantially S-shaped spacing-bridging portion of the foil.

Figure 9B:
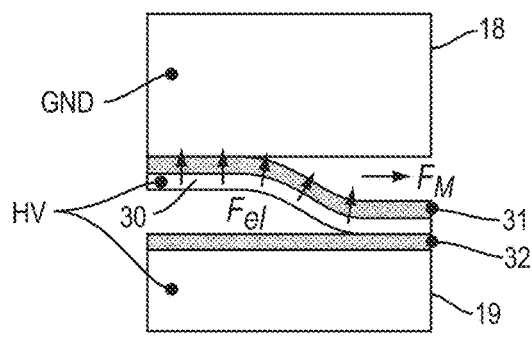

Referring to FIG. 9B, the housing 18 will typically be connected to ground (GND). The conductive plate 19 can be connected to a high voltage, indicated by HV in FIG. 9B, thus creating a voltage difference over the spacing between the housing 18 and the plate 19. If the conductive layer 30 is connected to a high voltage, then the foil will be repelled by the plate 19 and attracted by the housing 18. As a consequence, the foil will tend to move towards the housing and the S-shaped spacing bridging part will move to the right (see also FIG. 9A). In other words, electrical forces $F_{el}$ pulling the foil towards the housing cause a mechanical force $F_m$ to the right in FIG. 9B. The foil will cover the through holes 16 and the interior of the collision cell will be closed off.

Figure 9C:
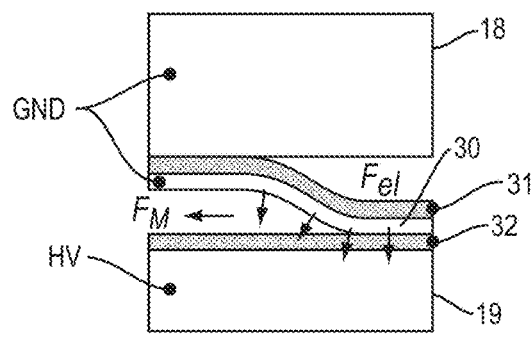

Referring to FIG. 9C, the through holes 16 can be opened by connecting the conductive layer 30 to ground instead of to the high voltage (HV). This will cause the foil to be repelled by the housing 18 and to be attracted by the plate 19, which in turn cause the S-shaped spacing bridging part to move to the left (see also FIG. 9A). In other words, electrical forces $F_{el}$ pulling the foil towards the plate 19 cause a mechanical force $F_m$ to the left in FIG. 9C. The foil will no longer cover the through holes 16 and the interior of the collision cell will be open to the surrounding atmosphere.

As the movement of the foil is controlled by voltages, which can be switched extremely quickly, and as the foil can have a very low mass, the movement of the foil can be very quick. Accordingly, the pressure inside the collision cell 1 can be adjusted very rapidly and switching between a pressurized state and an evacuated state can be carried out almost instantly.

Figure 10:
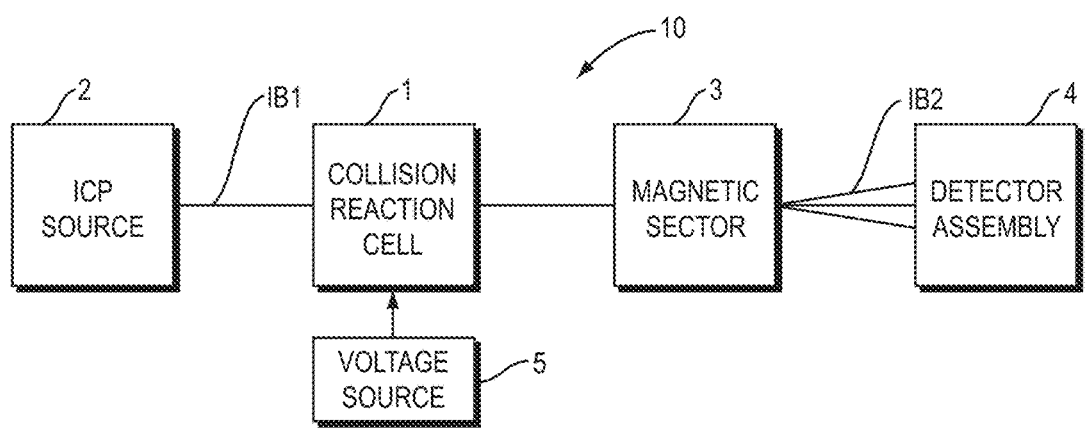
FIG. 10 schematically shows a mass spectrometer comprising an ion optical arrangement in accordance with the invention.

The exemplary mass spectrometer 10 schematically shown in FIG. 10 comprises a collision cell 1, which can be a collision cell as described above, but may be replaced by another type of ion guide. The mass spectrometer 10 may further comprise a plasma source 1, such as an ICP (inductively coupled plasma) source, for generating an ion beam IB1. The mass spectrometer may further comprise a mass filter 3, such as a magnetic sector mass filter. In the magnetic sector mass filter, the ion beam IB1 is separated into partial beams IB2 having different m/z (mass versus charge) ratios, which partial beams can be detected by the detector assembly 4, which may be a multiple detector assembly. The mass spectrometer 10 may further comprise a pump for lowering the gas pressure in the collision cell 1, a valve associated with the pump, a voltage source 5 for supplying DC and AC (RF) voltages to the collision cell 1, and a controller for controlling the various components of the mass spectrometer 10. The valve may comprise a foil-based valve and/or a Bourdon tube-based valve as described above.

Aspects of the invention comprise:
a) A multipole collision cell with variation of the number of oscillations in RF mode in order to average mass dependent trajectories (noding effect).
b) A multipole collision cell that is able to transmit an ion beam without RF potentials (no noding effect).
c) The ability to transmit high energy ions (kilovolt range).
d) Segmented multipoles (two, three or more segments per rod).
e) A multipole collision cell where not the rods but drag electrodes (such as vanes) are segmented in order to transmit ions in a DC-only mode.
f) A collision cell that is switchable between collision mode (filled with gas) and transmission mode (no gas) where the pumping cross section can be switched according to the cell mode.
g) No additional cross section in gas mode and additional cross section for transmission mode. These aspects of the invention may be used in isolation or in combination.

Although the invention has been described above mainly with reference to a collision gas, a reaction gas may additionally, or alternatively, be used. That is, the present invention also provides a reaction cell, as well as a collision/reaction cell. In some embodiments, the cell may have not two but three modes of operation: a collision mode, a reaction mode and a vacuum mode. It will be understood that in the vacuum mode, the pressure inside the cell may be greater than zero, but very small, such that any gas present in the cell has a negligible influence on the ions entering the cell.

It will be understood by those skilled in the art that the invention is not limited to the embodiments shown and that many additions and/or modifications can be made without departing from the scope of the invention as defined in the appending claims.

The invention claimed is:

1. An ion optical arrangement for use in a mass spectrometer comprising:
a collision cell defining an ion optical axis along which ions may pass;
electrodes comprising a set of parallel poles arranged in the collision cell;
a voltage source for providing voltages to the electrodes to produce electric fields;
wherein the ion optical arrangement is arranged for switching between a first operation mode in which the collision cell is pressurized and a second operation mode in which the collision cell is substantially evacuated, and
wherein the ion optical arrangement is further arranged for producing a radio frequency electric focusing field with the electrodes in the first operation mode and a static electric focusing field with the electrodes in the second operation mode.

2. The ion optical arrangement according to claim 1, wherein at least two of the poles are each partitioned in at least three electrically isolated sections consecutively arranged along a longitudinal axis of the pole, and wherein the voltage source is arranged for supplying different direct current voltages to adjacent sections of a pole in the second operation mode.

3. The ion optical arrangement according to claim 2, wherein the direct current voltages supplied to a first and a third section of a pole are substantially equal, while the direct current voltage supplied to a second section of a pole is a different voltage.

4. The ion optical arrangement according to claim 1, wherein number of parallel poles arranged in the collision cell equals at least four.

5. The ion optical arrangement according to claim 1, wherein the first operation mode is a low energy mode and the second operation mode is a high energy mode.

6. The ion optical arrangement according to claim 1, further comprising a pump for pressurizing the collision cell at least during the first operation mode and a pressure release mechanism for releasing gas pressure when switching from the first operation mode to the second operation mode.

7. The ion optical arrangement according to claim 6, wherein the pressure release mechanism comprises a valve operated by a Bourdon tube.

8. The ion optical arrangement according to claim 6, wherein the pressure release mechanism comprises an electrostatic mechanism.

9. The ion optical arrangement according to claim 8, wherein the electrostatic mechanism comprises an insulating foil provided with a conducting layer, which insulating foil covers at least one opening in the collision cell when a first voltage is applied and is spaced apart from the at least one opening when a second voltage is applied.

10. A mass spectrometer comprising an ion optical arrangement according to claim 1.

11. The mass spectrometer according to claim 10, further comprising at least one ion source and at least one detector arrangement.

12. An ion optical arrangement for use in a mass spectrometer comprising:
a collision cell defining an ion optical axis along which ions may pass;
electrodes comprising a set of parallel poles arranged in the collision cell;
a set of vanes arranged in spacings between adjacent poles and serving as electrodes for providing a static electric focusing field;
a voltage source for providing voltages to the electrodes and the vanes to produce electric fields;
wherein the ion optical arrangement is arranged for switching between a first operation mode in which the collision cell is pressurized and a second operation mode in which the collision cell is substantially evacuated, and
wherein the ion optical arrangement is further arranged for producing a radio frequency electric focusing field with the electrodes in the first operation mode and a static electric focusing field in the second operation mode.

13. The ion optical arrangement according to claim 12, wherein each vane is partitioned in at least three electrically isolated sections consecutively arranged along a longitudinal axis of the vane, and wherein the voltage source is arranged for supplying different direct current voltages to adjacent sections of a vane in the second operation mode.

14. The ion optical arrangement according to claim 13, wherein the direct current voltages supplied to a first and a third section of a vane are substantially equal, while the direct current voltage supplied to a second section of a vane is a different voltage.

15. The ion optical arrangement according to claim 12, wherein at least one vane comprises a series arrangement of resistors for providing a voltage gradient in the vane so as to produce an axial field gradient.

16. A method of filtering ions using a collision cell, the ions following a trajectory through the collision cell, the method comprising:
switching between a first operation mode in which the collision cell is pressurized and a second operation mode in which the collision cell is substantially evacuated; and
producing in the collision cell a radio frequency electric field focusing field in the first operation mode and a static electric focusing field in the second operation mode, wherein the radio frequency electric field focusing field is provided by electrodes comprising a set of parallel poles arranged in the collision cell and the static electric focusing field is provided by the electrodes or a set of vanes arranged in spacings between adjacent poles.

17. The method according to claim 16, wherein the first operation mode is a low energy mode and the second operation mode is a high energy mode.

18. The method according to claim 16, further comprising operating a valve when switching between the first operation mode and the second operation mode.

19. A software program product for carrying out the switching between operation modes and the producing of electric focusing fields according to claim 16.

* * * * *